United States Patent Office 2,715,631
Patented Aug. 16, 1955

2,715,631

AMINOMETHYLOXAZOLIDINES

Willard J. Croxall, Elkhart, Ind., and Sidney Melamed, Philadelphia, Pa., assignors to Rohm & Haas Company, Philadelphia, Pa., a corporation of Delaware No Drawing. Application December 23, 1952,
Serial No. 327,662

7 Claims. (Cl. 260—307)

This invention relates to aminomethyloxazolidines of the structure

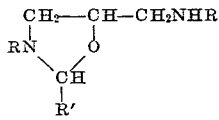

wherein R represents a hydrocarbon group and R' represents hydrogen or a hydrocarbon group of not over 21 carbon atoms. The substituent R may be an aliphatic hydrocarbon group, particularly an alkyl group, a cycloalkyl group, an aralkyl group, or an aryl group, preferably not over 18 carbon atoms. When R' is a hydrocarbon group, it is aliphatic, aryl, arylaliphatic, or cycloaliphatic and preferably contains not over nine carbon atoms. When R' is hydrocarbon, the group R is attached to nitrogen at a non-tertiary carbon atom, i. e. at a primary or secondary carbon atom. When, however, R' is hydrogen, greater latitude as to type of R group is permitted and the carbon atom at the point of attachment to nitrogen may be primary, secondary, or tertiary.

It may be further noted that R is not confined to hydrocarbon groups, but may be alkoxyalkyl, dialkylaminoalkyl, alkylthioalkyl, and the like, as typified by such specific groups as methoxypropyl, butoxypropyl, octoxypropyl, methylthiopropyl, butylthiopropyl, octylthiopropyl, dimethylaminopropyl, dioctylaminopropyl, dibutylaminopropyl, and so on. This situation serves to emphasize that the precise nature of R (or R') is not critical so long as it is free of reactive hydrogen or reactive substituents.

The compounds of this invention are useful in the fields of pharmacy, plasticizers, and pesticides and as chemical intermediates. They react, for example, with alkylating or aralkylating agents to form valuable quaternary ammonium compounds, which have surface activity and bactericidal action. They act as basic substances in various catalytic reactions and serve as acid absorbers. They react with chloromethylated styrene resins which have been insolubilized with a cross-linking agent such as a polyvinylbenzene to give anion-exchange resins of considerable, yet controlled basicity. They react with acyl halides to give compounds having an amino group and an amide group. They react with ethylene oxide to give polyethoxyethanol derivatives which have surface activity, the polyethoxyethanol chain being attached to the starting nucleus at a nitrogen atom thereof.

These reactions establish that in the process to which this invention also relates wherein a diamine of the formula RNHCH₂CH(OH)CH₂NHR is reacted with an aldehyde R'CHO, the —OH group and one —NH— group react with the aldehyde to form a cycle. This leaves an aminomethyl substituent having a reactive hydrogen on an amino nitrogen. It is this hydrogen which is reactive.

This is a very surprising outcome, for the art shows that the reaction between a 1,3-diaminopropane and an aldehyde leads to ring closure involving the two amino nitrogen atoms and their hydrogen atoms, these being apparently of equal value and activity, even though there may be substituents on the hydrocarbon chain. The art would thus indicate that 5-hexahydropyrimidols would be formed.

Both these and the aminomethyloxazolidines of this invention have two titratable amino groups and one reactive hydrogen. But when the hydrogen is reacted, quite different results are obtained.

When the aminomethyloxazolidines of this invention are reacted with an acyl halide, there results an amide. This is shown by the fact that the resulting compound contains only one titratable amino group. In contrast an N,N'-disubstituted hexahydropyrimidol would still have two amino groups. Furthermore, the infrared absorption data for the reaction products support the structure for aminomethyloxazolidines.

The process of this invention is carried out by reacting by condensing together a diamine of the formula

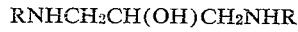

and an aldehyde of the formula R'CHO. The reaction is effected by bringing the two reactants together in approximately equimolecular proportions directly or in the presence of a solvent and eliminating a mole of water per mole of diamine. To accomplish this it is particularly convenient to employ a solvent which forms an azeotrope with water. The condensation is then readily accomplished by heating the reactants with solvent under reflux and trapping out the water. Useful solvents include naphthas, benzene, toluene, xylene, butyl ethers, etc. Temperatures of reaction are usually between about 30° and 125° C. and preferably with formaldehyde between 30° and about 80° C. Water of reaction is separated. The product is collected as a residue, which may in many cases be purified, as by distillation at low pressures.

The diamines used in the preparation of the compounds of this invention are available through the reaction of an epihalohydrin and a primary amine, which is used in molecular excess. At least two moles of a primary amine are reacted with a mole of epichlorohydrin or epibromohydrin. Two moles of amine are required to react with the epihalohydrin and additional amounts of amine serve to take up hydrogen halide formed in the reaction. The hydrogen halide formed may also be taken up with inorganic bases, such as sodium or potassium hydroxide or with basic ion-exchange resins.

Typical primary amines which are useful in preparing the intermediate diamines include alkylamines, such as methylamine, ethylamine, butylamine, amylamine, hexylamine, octylamine, nonylamine, decylamine, dodecylamine, hexadecylamine, octadecylamine, and homologues of these and also isomers; unsaturated aliphatic amines, such as allylamine, methallylamine, octenylamine, undecenylamine, octadecenylamine, and the like; alicyclic amines, such as cyclohexylamine, methylcyclohexylamine, terpenylamine, dicyclopentenylamine, etc.; arylalkylamines, such as benzylamine, butylbenzylamine, phenylpropylamine, etc.; aromatic amines, such as aniline, ar-methylaniline, etc.; and such amines as methoxypropylamine, butylthiopropylamine, or dimethylaminopropylamine.

Typical preparations of 2-hydroxy-1,3-propylenediamines are shown in the following examples.

Example A

A solution of 620 parts by weight of methylamine in 1000 parts of water was stirred and heated to 45° C. Thereto was slowly added 185 parts of epichlorohydrin at such a rate that the temperature of the reaction mixture was maintained between 45° and 50° C. Methylamine was passed as a gas through the reaction mixture. After all of the epichlorohydrin had been added, the flow of methylamine was discontinued and the reaction mixture was heated under reflux for 16 hours. The mixture was concentrated by heating under a pressure of 30 mm. The resulting residue was taken up in water and treated with a strongly basic anion-exchange resin having quaternary hydroxide groups to remove chloride ions. The solution was then evaporated. The oil obtained as a residue was fractionally distilled. The fraction taken at 80°–90° C./0.11 mm. had an index of refraction, $n_D^{20}$, of 1.4644. It contained by titration 23.7% of nitrogen and corresponded in composition to 1,3-dimethylamino-2-hydroxy propane, for which the theoretical nitrogen content is 23.7%.

A second fraction was isolated at 140°–158° C./0.2 mm. It had a refractive index of 1.4852 and contained by analysis 20.2% of nitrogen, corresponding in composition to bis(3 - methylamino - 2 - hydroxypropyl)methylamine, $CH_3N(CH_2CHOHCH_2NHCH_3)_2$.

*Example B*

A solution of 792 parts of cyclohexylamine in 600 parts of toluene was heated to refluxing temperature and thereto was slowly added 185 parts of epichlorohydrin. The reaction mixture was heated under reflux for 24 hours. It was cooled. Cyclohexylamine hydrochloride crystallized out and was filtered off. The filtrate was washed with about 225 parts of aqueous 20% sodium hydroxide solution and dried over magnesium sulfate. The drying agent was removed by filtration and the solvent was distilled to give a solid residue. This was recrystallized from naphtha to give 250 parts of a white, flaky solid, which after being dried in a desiccator had a melting point of 75°–77° C. From the mother liquor there was obtained another 47 parts of product. The product was 1,3-bis-(cyclohexylamino)-2-propanol. The nitrogen content of the product as obtained was 10.9% (theory 11.0%).

*Example C*

A solution of 250 parts by weight of tert.-octylamine in 160 parts by weight of toluene was heated to reflux temperature and thereto was slowly added 47 parts by weight of epichlorohydrin. The reaction mixture was heated at reflux for about 16 hours. It was then washed with water and a dilute solution of sodium hydroxide. The organic layer was separated from the aqueous layer, dried over calcium sulfate, and heated to evaporate the solvent. The residue from this operation was fractionally distilled at reduced pressure. At 130°–135° C./0.3 mm. there was taken off a fraction which corresponded in composition to 1,3-bis-tert.-octylamino-2-propanol. It was a viscous, colorless, odorless oil which was insoluble in water. It was found to contain 8.8% of nitrogen by analysis (theory 8.9%).

*Example D*

Epichlorohydrin in an amount of 92.5 parts by weight was slowly added to a refluxing solution of 600 parts of 3,5,5-trimethylhexylamine in 500 parts of toluene. Since the amine hydrochloride as well as the diamine was soluble in the reaction mixture, sufficient 50% aqueous sodium hydroxide solution was added to convert the hydrochloride to sodium chloride. The organic layer was well washed with salt water to remove all of the caustic, as failure to do so results in decomposition of product during the subsequent distillation. The organic layer was dried over sodium sulfate and the solvent distilled therefrom to yield a residue which was fractionally distilled at low pressure. At 176°–180° C./1 mm. there was obtained a fraction of 220 parts. It was a viscous, pleasant-smelling oil having a refractive index, $n_D^{20}$, of 1.4629 and corresponding in composition to 1,3-bis(3,5,5-trimethylhexylamino)-2-propanol. It contained by analysis 7.8% of nitrogen (theory 8.2%).

*Example E*

A solution of 241 parts of hexadecylamine in 200 parts of toluene was heated to reflux temperature and treated with 18.5 parts of epichlorohydrin. Upon completion of the reaction the reaction mixture was treated with an aqueous 50% caustic soda solution. The organic layer was thoroughly washed with water and dried. The dry solution of product was concentrated and then fractionated in a molecular still. At a bath temperature of 180°–210° C./20–30 microns there was obtained a 60% yield of a waxy solid which corresponded in composition with 1,3-bis(hexadecylamino)-2-propanol. The fraction contained by analysis 5.5% of nitrogen (theory 5.2%).

*Example F*

In the same way 269 parts of octadecylamine and 18.5 parts of epichlorohydrin in 250 parts of toluene were reacted, washed, and purified. A 68% yield of product was obtained in the molecular still at a pot temperature of 200°–210° C./20 microns. It was a waxy solid which contained 4.8% of nitrogen (theory 4.6%) and was 1,3-bis(octadecylamino)-2-propanol.

*Example G*

The procedure of Example F was followed with 267 parts of octadecenylamine and 18.5 parts of epichlorohydrin. The product obtained at 200°–215° C./20–25 microns was 1,3-bis(octadecenylamino)-2-propanol.

The same procedures are applicable to reactions of epihalohydrins and benzylamine, aniline, or other types of amines. These amines react in the same way as those shown above to give hydroxydiamines. As will be shown below, all of these hydroxydiamines react with aldehydes to form 5-aminomethyloxazolidines.

The simplest aldehyde which can be used is formaldehyde, which is of considerable interest in that it leads to aminomethyloxazolidines which are unsubstituted in the 2-position and which may have the greatest variety of N-substituents. When other than formaldehyde is used, the group R' in aldehydes of the formula R'CHO may be a hydrocarbon group such as alkyl, including methyl, ethyl, propyl, butyl, octyl, nonyl, etc., unsaturated aliphatic hydrocarbon as in crotonaldehyde or 4-penten-1-al, or a phenyl group, particularly as in benzaldehyde, methylbenzaldehyde, or butylbenzaldehyde, arylaliphatic as in cinnamylaldehyde or phenylacetaldehyde, cycloaliphatic as in hexahydrobenzaldehyde, and so on. It is preferred that the aldehyde contain not over nine carbon atoms, but it is emphasized that larger aldehydes with 16 to 22 carbon atoms, as obtained, for example, from large olefins in the oxo reaction, have been found capable of entering into the reaction with the diamines. When R' is a hydrocarbon group, it is desirable that the carbon atom alpha to the —CHO group is either free of hydrogen or holds not more than one hydrogen atom, as in the case of isobutyraldehyde, α-ethylbutyraldehyde, α-ethylhexaldehyde, methylethylacetaldehyde, and the like. But reacting aldehydes are not confined to those in which R' is hydrocarbon and R' may represent the residue, for example, of furfuraldehyde.

The reaction of hydroxydiaminopropanes and aldehydes is shown in the following specific illustrative examples. Parts are by weight.

*Example 1*

To a solution of 30 parts by weight of 1,3-bis(methylamino)-2-propanol in 160 parts of benzene there is slowly added with stirring 21 parts of an aqueous 37% formaldehyde solution. The reaction mixture is heated with reflux, water being taken off in a trap. When water is no longer obtained, the benzene is driven off and the residue is fractionally distilled. The main fraction is collected at 90°–95° C./0.06 mm. and amounts to 29 parts, an 89% yield. It is a colorless oil which contains by analysis 21.1% of nitrogen and had a refractive index of 1.4779.

This oil reacts with acetyl chloride or other acyl halides to form amides therewith.

As illustrative of this reaction, 13 parts of the oil are dissolved in carbon tetrachloride. The solution is chilled in an ice bath and treated with 14 parts of benzoyl chloride, while the temperature is held at 0°–5° C. The reaction mixture is left standing overnight and then washed several times with aqueous 10% sodium hydroxide solution and with water. The solvent is evaporated to leave a residue which contains 11.7% of nitrogen. When this is titrated with perchloric acid in glacial acetic acid, it gives a neutral equivalent of 240. The formaldehyde content thereof is found through digestion with phosphoric acid to be 12.7%. The oil, therefore, is 5-methylaminomethyl-3-methyloxazolidine, for which the calculated nitrogen content is 21.5%. The benzoyl derivative has a theoretical nitrogen content of 11.9%, a formaldehyde content of 12.8%, and a neutral equivalent of 234.

*Example 2*

A mixture of 25 parts of 1,3-bis(methylamino)-2-propanol, 30 parts of 3,5,5-trimethylhexaldhyde, and 160 parts of benzene is placed in a reaction vessel and heated under reflux. Water is taken off with a trap, in about six hours 3.8 parts of water being evolved. Benzene is then distilled from the reaction mixture and the product is distilled at 130°–145° C./0.2 mm. It amounts to 37 parts by weight, a yield of 73%. This material has a nitrogen content of 11.9%, corresponding in composition to 2-(2,4,4 - trimethylpentyl) - 3 - methyl - 5 - methylaminomethyloxazolidine.

There are taken 13.5 parts of this compound and a solution thereof is prepared in about 50 parts of toluene. This solution is cooled to about 0° in an ice bath and treated with four parts of acetyl chloride. The mixture is stirred for two hours while the mixture is allowed to warm up. It is washed with dilute aqueous sodium hydroxide solution and water and then dried. The solvent is stripped off by heating the solution on a steam bath under reduced pressure. The resulting product has a nitrogen content of 10.3% (theory 10.37%) and a formaldehyde content of 11% (theory 11.1%). Titration with perchloric acid in glacial acetic acid gives an equivalent weight of 269 (theory 270). These data confirm that the structure of the compound prepared is

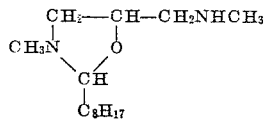

where the C₈H₁₇ group is in fact 2,4,4-trimethylpentyl.

*Example 3*

A mixture of 30 parts of 1,3-bismethylamino-2-propanol, 26.5 parts of benzaldehyde, and 120 parts of benzene is heated under reflux with removal of water by a trap. When water is no longer elvolved, benzene is taken off and the product is isolated as a residue. It contains 13.2% of nitrogen and corresponds in composition to 2-phenyl - 3 - methyl - 5 - methylaminomethyloxazolidine, for which the theoretical nitrogen content is 13.6%.

Reaction of this compound with acetyl chloride as described in previous examples yields an aminoamide, having an equivalent weight as determined by titration of 250 (theory 248). This confirms the structure of the above compound.

*Example 4*

A mixture of 50.5 parts by weight of 1,3-bisbutylamino-2-propanol, 20 parts of aqueous 37% formaldehyde solution, and 120 parts of benzene is heated under reflux with removal of water. When water is no longer evolved, the benzene is boiled off and the product is distilled at 120°–130° C./0.1 mm. It contains by analysis 12.5% of nitrogen and yields 13.6% of formaldehyde, corresponding in composition to 3-butyl-5-butylaminomethyloxazolidine, for which theoretical values are 13.1% of nitrogen and 14% of formaldehyde.

Reaction of this compound with acetyl chloride as described above yields an aminoamide, 3-butyl-5-N-butylacetamidomethyloxazolidine, which by titration has a neutral equivalent of 254 (theory 256) and a formaldehyde content of 11.7% (11.72% theory).

*Example 5*

In the same way 50.5 parts of 1,3-bisbutylamino-2-propanol, and 18 parts of isobutyraldehyde in benzene are reacted with removal of water. Concentration and distillation yield 53 parts of 2-isopropyl-3-butyl-5-butylaminomethyloxazolidine, which distills at 130°–135° C./0.1 mm. and contains 10.6% of nitrogen (theory 10.9%).

Reaction with acetylchloride as above converts this compound into the corresponding N-butylacetamidomethyl derivative, for which the nitrogen content is 9.4%, the formaldehyde content is 10%, and the neutral equivalent is 295.

*Example 6*

A solution of 42.5 parts by weight of 1,3-bisallylamino-2-propanol in 160 parts of benzene is cooled to 20° C., stirred, and treated with 30 parts of phenylacetaldehyde. The reaction mixture is stirred at room temperature for two hours. A small amount of water separates and is taken off. The organic layer is dried over magnesium sulfate and distilled. After benzene has been removed, distillation is conducted under reduced pressure. The fraction obtained at 140°–155° C./0.1 mm. corresponds in composition to 2-benzyl-3-allyl-5-allylaminomethyloxazolidine.

This compound yields aminoamides when reacted with acetyl chloride or benzoyl chloride. These amides contain one titratable amino nitrogen and give equivalent weights in agreement with the structure of the above oxazolidine.

*Example 7*

A mixture of 64 parts of 1,3-biscyclohexylamino-2-propanol, 20.5 parts of aqueous 37% formaldehyde solution, and 160 parts of benzene is heated under reflux with removal of water. A large reaction vessel is used for this reaction because of persistent foaming during the reaction. The reaction, nevertheless, progresses and 18 parts of water are taken off. Upon distillation a fraction is obtained at 160°–173° C./0.2 mm. which contains 10.3% of nitrogen (theory 10.5%) and corresponds in composition to 3-cyclohexyl-5-cyclohexylaminomethyloxazolidine. The yield is 48 parts or 73%.

This compound also reacts with acetyl chloride to form the corresponding aminoamide having an equivalent weight of about 310 by titration with perchloric acid in glacial acetic acid.

*Example 8*

A mixture of 64 parts of 1,3-biscyclohexylamino-2-propanol, 25 parts of 2-ethylbutyraldehyde, and 160 parts of toluene is heated under reflux with separation and removal of water. Distillation of the residual mixture after solvent has been distilled off gives 55 parts of 2-(3-pentyl)-3-cyclohexyl - 5 - cyclohexylaminomethyl oxazolidine. This product contained 8.4% of nitrogen (theory 8.3%). It yields with acetyl chloride an aminoamide having an equivalent weight of about 380.

*Example 9*

A mixture of 51 parts of 1,3-biscyclohexylamino-2-propanol, 28.5 parts of 3,5,5-trimethylhexaldehyde, and 120 parts of benzene is heated under reflux with removal of water by a trap. When water is no longer evolved, benzene is distilled off and the residue stripped to 120° C./1 mm. There remains 70 parts of an oily residue which corresponds in composition to 2-(2,4,4-trimethylpentyl)-

3-cyclohexyl-5-cyclohexylaminomethyloxazolidine. This contains by analysis 7.3% of nitrogen (theory 7.4%) and has a neutral equivalent of 192 (theory 189). This compound reacts with acetyl chloride to form an aminoamide, which has an equivalent weight of about 340.

Example 10

A mixture of 81 parts of 1,3-di-tert.-octylamino-2-propanol, 22 parts of aqueous 37% formaldehyde solution, and 160 parts of benzene is heated under reflux. A total of 21 parts of water is removed with the aid of a trap. The reaction solution is distilled. At 152°–157° C./0.1 mm. a fraction of 3-tert.-octyl-5-tert.-octylaminomethyloxazolidine is obtained in a yield of 58%. It contains by analysis 8.5% of nitrogen (theory 8.6%) and has a refractive index, $n_D^{20}$, of 1.4753. It reacts with acetyl chloride to form an aminoamide which has an equivalent weight of about 375 by the standard method of titration.

Example 11

A solution of 239 parts of 1,3-bis(3,5,5-trimethylhexylamino)-2-propanol in 500 parts by weight of benzene is treated with 81 parts of aqueous 37% formaldehyde solution. There is no observable reaction in the cold. The mixture is heated under reflux until water no longer is obtained. A total of 80 parts of water is taken off. The product is isolated as a concentrate in 90% yield. It contains 7.7% of nitrogen (theory 7.9%) and is 3-(3,5,5-trimethylhexyl) - 5 - N - (3,5,5 - trimethylhexyl) - aminomethyloxazolidine.

Example 12

Equimolecular quantities of 1,3-bis(3,5,5-trimethyl hexylamino)-2-propanol and 3,5,5-trimethylhexaldehyde in benzene are heated under reflux with removal of water. The product is obtained as a residue after the benzene has been stripped off under reduced pressure. It contains 6.0% of nitrogen and is 2-(2,4,4-trimethylpentyl)-3-(3,5,5-trimethylhexyl)-5-N - (3,5,5 - trimethylhexyl) aminomethyloxazolidine, the theoretical nitrogen content of which is 6.0%. This compound reacts with acetyl chloride as above to form an aminoamide having an equivalent weight of 480–500.

Example 13

There are reacted in toluene solution 50 parts of 1,3-bisalkylamino-2-propanol and 9 parts of aqueous 37% formaldehyde solution. The alkyl groups of the bisalkylaminopropanol contain 12 and 15 carbon atoms in branched chain arrangement, being obtained from a propylene polymer cut as a source of hydrocarbon group. The average molecular weight of the bis(alkylamino)-propanol is 472. Water is taken off during refluxing of the solution, benzene is evaporated, and the product is obtained as a residue. It contains by analysis 5.9% of nitrogen and yields 6.2% of formaldehyde. Calculated values are 5.8% and 6.2%, respectively, for the 3-alkyl-5-alkylaminomethyloxazolidines, based on the apparent molecular sizes involved. The product yields aminoamides upon reaction with acyl halides. These have only one titratable nitrogen.

Example 14

A mixture of 54 parts of 1,3-bishexadecylamino-2-propanol, 8.4 parts of allylacetaldehyde, and 120 parts of benzene is heated under reflux with removal of water. Benzene is distilled off and the residue is stripped to 120° C./1 mm. to yield a waxy, semisolid product, which is 2-butenyl-3 - hexadecyl - 5 - hexadecylaminomethyloxazolidine, in almost quantitative yield. This compound likewise reacts with acyl halides to form aminoamides.

Example 15

A mixture of 59 parts of 1,3-bisoctadecenyl amino-2-propanol, 8.1 parts of aqueous 37% formaldehyde solution, and 120 parts of benzene is heated under reflux with separation and removal of water. The product is isolated as above as a semi-solid concentrate. It contains 4.7% of nitrogen (theory 4.64%) and corresponds in composition to 3-octadecenyl-5-octadecenylaminomethyloxazolidine.

Example 16

A mixture of 56 parts of 1,3-bisbenzylamino-2-propanol, 16.5 parts of aqueous 37% formaldehyde, and 100 parts of benzene is heated under reflux with removal of water. The product is isolated by distillation. It distills at 145°–155° C./0.1 mm. in 78% yield and corresponds in composition to 3-benzyl-5-benzlyaminomethyloxazolidine. This compound likewise reacts with acetyl chloride to form an aminoamide which has by titration an equivalent weight of about 330.

Example 17

Fifty-six parts of 1,3-bisbenzylamino-2-propanol and 19.2 parts of furfural in 120 parts of benzene is heated under reflux with removal of water. Benzene and other volatile materials are striped off by heating under low pressure and the product is obtained as a dark, viscous residue. It contains 7.9% of nitrogen (theory 8.0%) and is 2-furyl-3-benzyl-5-benzylaminomethyloxazolidine.

This example also demonstrates again how aldehydes having cyclic substituents can be used. The cycle may be phenyl, benzyl, cyclohexyl, etc.

Example 18

A mixture of 48.4 parts of 1,3-bisanilino-2-propanol, 16.5 parts of aqueous 37% formaldehyde solution, and 160 parts of chloroform is heated under reflux for two days until the theoretical amount of water has been taken off. Solvent is distilled off and the product is obtained as a low melting solid. It contains 10.8% of nitrogen (theory 11.0%) and yields 11.5% of formaldehyde (theory 11.8%), thus corresponding in composition to 3-phenyl-5 - phenylaminomethyloxazolidine. This compound likewise reacts with acetyl chloride to form an aminoamide.

Example 19

A mixture of 68 parts of 1,3-bis(3,5,5-trimethylhexylamino) - 2 - propanol, 28 parts of p-chlorobenzaldehyde, and 160 parts of benzene is heated under reflux with removal of water. After benzene has been taken off the residue is fractionally distilled. At 165°–197° C./1 mm. a fraction is obtained which corresponds to 2-p-chlorophenyl-3 - (3,5,5-trimethylhexyl)-5 - (3,5,5 - trimethylhexyl)aminomethyloxazolidine. This compound reacts with acetyl chloride to form an aminoamide which by titration has an equivalent weight of about 470.

The compounds in which R is an aliphatic hydrocarbon group of eight to sixteen carbon atoms have a combination of properties which make them valuable pesticidal agents. They exhibit good fungicidal activity at considerable dilutions and couple this property with resistance to removal by water-washing. They also give contact insecticidal action. For example, the 3-tert.-octyl-5-tert.-octylaminomethyloxazolidine gives complete inhibition of germination of spores of *Macrosporium sarcinaeforme* at 0.005% by standard fungitoxicity tests and has a tenacity value of over 16 minutes. Tenacity is determined by treating cellulose nitrate coated plates with a 0.01% solution or dispersion of the compound under test, drying, then washing the plates for periods of time, placing spores thereon, and then incubating. The tenacity value is the time in minutes which the plate can be washed without permitting germination of the spores. With 3-(3,5,5 - trimethylhexyl) - 5-(3,5,5-trimethylhexyl)aminomethyloxazolidine and with 2-(2,4,4-trimethylpentyl)-3-(3,5,5 - trimethylhexyl)-5 - (3,5,5-trimethylhexylaminomethyloxazolidine there was complete inhibition of spores of *Macrosporium sarcinaeforme* at 0.00005% and tenacity values were greater than 16 minutes. With the 3-alkyl-5 - alkylaminoalkyl derivative in which the alkyl groups were derived initially from a $C_{12}$ to $C_{15}$ propylene polymer inhibition was complete at 0.001% and tenacity values were over 16 minutes. It is of interest that the 3 - cyclohexyl - 5-cyclohexylaminomethyloxazolidines had very low tenacity values.

Insecticidal action is noted against aphids, mites, red spiders, and the like. For example, the 3-tert.-octyl-5-tert.-octylaminomethyloxazolidines give a 99% kill at 1:400 against aphids. A spray containing about 1% of these compounds gives 70% to 75% control of bean beetle larvae.

This application is a continuation-in-part of application Serial No. 195,142, filed November 10, 1950, now abandoned, wherein the reaction of aldehydes and 1,3-diamino-2-propanols was first described. The present application presents additional data which establish the structures of the products resulting from this reaction.

We claim:
1. As new chemical substances, compounds of the formula

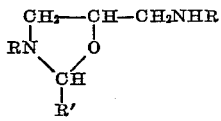

wherein R' represents a member of the class consisting of hydrogen and alkyl, alkenyl, benzyl, and phenyl groups of not over 21 carbon atoms and R represents a hydrocarbon group of not over 18 carbon atoms from the class consisting of alkyl, alkenyl, cycloalkyl, benzyl, and phenyl groups.

2. As a new chemical substance, a compound of the formula

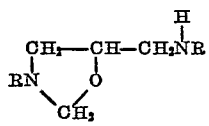

wherein R is an alkyl group of eight to sixteen carbon atoms.

3. As a new chemical substance, a compound of the formula

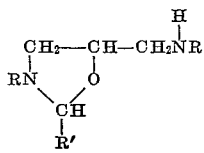

in which R is an alkyl group of eight to sixteen carbon atoms and R' is an alkyl group of not over eight carbon atoms in which the carbon atom connecting R' to the cycle holds at most one hydrogen atom.

4. As a new chemical substance, 3 - nonyl-5 - nonylaminomethyloxazolidine.

5. As a new chemical substance, 3-hexadecyl-5-hexadecylaminomethyloxazolidine.

6. As a new chemical substance, 2-isopropyl-3-nonyl-5-nonylaminomethyloxazolidine.

7. As a new chemical substance, 2-(2,4,4 - trimethylpentyl)-3-(3,5,5 - trimethylhexyl) - 5-(3,5,5 - trimethylhexyl)aminomethyloxazolidine.

References Cited in the file of this patent
UNITED STATES PATENTS

| | | |
|---|---|---|
| 1,972,965 | Ulrich et al. | Sept. 4, 1934 |
| 2,194,314 | Maxwell | Mar. 19, 1940 |
| 2,243,295 | Susie et al. | May 27, 1941 |